United States Patent [19]

Akasaka

[11] Patent Number: 5,802,235
[45] Date of Patent: Sep. 1, 1998

[54] DISPERSION COMPENSATING FIBER AND ITS MANUFACTURING METHOD

[76] Inventor: Youichi Akasaka, B-241, Kyowayukashataku, 3, Tatsumidaihigashi 4-chome, Ichihara-shi, Chiba, Japan

[21] Appl. No.: 871,811

[22] Filed: Jun. 9, 1997

[30] Foreign Application Priority Data

Jun. 10, 1996 [JP] Japan ................................ 8-147619

[51] Int. Cl.$^6$ ........................................... G02B 6/16
[52] U.S. Cl. ........................... 385/123; 65/398; 65/427; 385/124; 385/142
[58] Field of Search .......................... 385/123, 124, 385/126, 127, 141, 142, 144; 65/397, 398, 427, 428

[56] References Cited

U.S. PATENT DOCUMENTS

| | | | |
|---|---|---|---|
| 5,430,822 | 7/1995 | Shigematsu et al. | 385/123 |
| 5,555,340 | 9/1996 | Onishi et al. | 385/127 |
| 5,568,583 | 10/1996 | Akasaka et al. | 385/123 |
| 5,673,354 | 9/1997 | Akasaka et al. | 385/127 |
| 5,680,491 | 10/1997 | Shigematsu et al. | 385/123 X |
| 5,740,297 | 4/1998 | Onishi et al. | 385/127 |

FOREIGN PATENT DOCUMENTS 5-286735  11/1993  Japan.

OTHER PUBLICATIONS

"Optimum Dispersion Compensating Fiber: Birefringence and PMD Simulation and Fiber Process Improvement". Chesnoy, Nouchi, Boniort, Brehm, Le Sergent, and Sansonetti. International Wire & Cable Symposium Proceedings 1995 [No Month] pp. 343–346.

*Primary Examiner*—John D. Lee

[57] ABSTRACT

A dispersion compensating fiber is provided which is capable of reducing the birefringence of the core caused in spinning to suppress an increase in polarization mode dispersion due to the birefringence of the core even though the surface of the core rod is ground to shape the profile of the core during manufacturing. A silica glass cladding 2 doped with fluorine is disposed to surround a silica glass core 1 doped with germanium. The variation in circumferential concentration of germanium at the periphery of the core 1 is set at 0.05% or smaller in relative refractive index difference value.

3 Claims, 3 Drawing Sheets

DISPERSION COMPENSATING FIBER AND ITS MANUFACTURING METHOD

FIELD OF THE INVENTION

The present invention relates to a dispersion compensating fiber for compensating for dispersion caused in optical communications performed at a wavelength of 1.55 μm by use of an optical fiber having zero dispersion at a wavelength of 1.3 μm.

BACKGROUND OF THE INVENTION

In recent years, it has been under study to perform a long-haul large-capacity transmission by use of an optical signal with a wavelength of 1.55 μm which is considered to be transmitted with the lowest losses in theory. Presently installed optical transmission lines, i.e. existing optical transmission lines are constructed of single-mode optical fibers. The dispersion wavelength characteristic of the single-mode optical fiber is such that dispersion is zero at a wavelength of 1.3 μm and increases as the wavelength increases or decreases from 1.3 μm. At a wavelength of 1.55 μm, a great positive dispersion is caused. Therefore, when light with a wavelength of 1.55 μm is transmitted over existing transmission lines constructed of single-mode optical fibers designed to transmit at wavelengths of 1.3 μm, the waveform is distorted. In order to compensate for the dispersion of the single-mode optical fiber at a wavelength of 1.55 μm, it is attempted to cancel the dispersion by inserting a dispersion compensating fiber having at a wavelength of 1.55 μm a great dispersion of a sign opposite to that of the above-mentioned dispersion, that is, a large negative dispersion.

To obtain a great negative dispersion, the difference between the refractive indices of the core and the cladding needs to be extremely large or the diameter of the core needs to be extremely small compared with the single-mode optical fiber. If the diameter of the core is extremely small, level difference is caused at the connection with the single-mode optical fibers, so that problems arise such as an increase in splice loss. Therefore, a dispersion compensating fiber is commonly used which has a profile of a high refractive index difference structure between the refractive indices of the core and the cladding.

In a dispersion compensating fiber having the high refractive index difference structure, the refractive index adjuster (GeCl4) for increasing the refractive index of the core is doped by frame-hydrolyzing the adjuster together with the glass material (SiCl4) gas, and the fluorine for decreasing the refractive index of the cladding is doped by vitrifying a porous cladding material in an atmosphere including fluorine. Therefore, if the core and the cladding are simultaneously synthesized like the single-mode optical fiber, the fluorine is doped not only in the cladding but also in the core in the vitrification, so that the profile of the high refractive index structure cannot be obtained. Thus, for dispersion compensating fiber, it is impossible to simultaneously synthesize the core and the cladding (for the single-mode optical fiber, generally, the core and a part of the cladding are simultaneously produced by the vapor axial deposition (VAD) method).

Therefore, the dispersion compensating fiber is manufactured in the following manner: First, a silica-based porous core material formed only of silica-based glass (core composition) doped with germanium is synthesized by a known method such as the VAD method, and then, the core material is dehydrated and sintered to form a core rod material. Then, after the core rod material is stretched so as to have a predetermined diameter to form a core rod, a silica-based porous cladding layer is deposited on the periphery of the core rod. Then, the core rod is dehydrated and sintered in an atmosphere including fluorine to obtain a glass material. By melt-spinning the glass material, the dispersion-compensating fiber is obtained.

According to the dispersion compensating fiber manufacturing method, prior to the deposition of the silica-based porous cladding layer constituting the cladding on the core rod, an OH radical and the like which adhered to the surface of the core rod in the stretching process is removed by grinding by a chemical or a physical technique. To suppress polarization mode dispersion (PMD), it is required that the cross-sectional profile of the dispersion-compensating fiber be symmetrical. The symmetry is required particularly of the profile of the core; in fact, it is desired that the profile of the core be substantially completely symmetrical. For this reason, in order to shape the profile of the core, the surface of the core rod is sometimes ground more than necessary for removing the OH radial and the like.

OBJECT AND SUMMARY OF THE INVENTION

However, it has been found that in dispersion compensating fiber having undergone the core rod surface grinding process during manufacturing, a polarization mode dispersion which is great compared with that caused in a dispersion compensating fiber not having undergone the core rod surface grinding process during manufacturing is caused due to the birefringence of the core.

Polarization mode dispersion is a great barrier in increasing the speed of long-haul optical communication systems.

In view of the problem, an object of the present invention is to provide a structure of a dispersion compensating fiber capable of suppressing the generation of the polarization mode dispersion, and its manufacturing method.

According to a first aspect of the present invention, a dispersion compensating fiber is provided that comprises a silica glass core doped with germanium and a silica glass cladding doped with fluorine, said cladding being provided to surround the core, a variation in circumferential concentration of germanium at a periphery of a center core situated in a center of the silica glass core is 0.05% or smaller in refractive index difference value.

According to a second aspect of the present invention, a dispersion compensating fiber is provided comprising a silica glass center core doped with germanium, a silica glass side core doped with fluorine and a silica glass cladding, said side core being provided to surround the center core, said cladding being provided to surround the side core, a variation in circumferential concentration of germanium at a periphery of the center core situated in a center of a silica glass core is 0.05% or smaller in relative refractive index difference value.

According to a third aspect of the present invention, after a variation in circumferential concentration of germanium at a periphery of a core rod obtained by dehydrating and sintering a silica-based porous core material doped with germanium is set at 0.05% or smaller in relative refractive index difference value, a silica-based porous cladding layer doped with fluorine is deposited to surround the core rod, and then, the core rod is dehydrated and sintered to obtain a glass material which is then melt-spun.

In the dispersion compensating fiber according to the first and second aspects of the present invention which is manufactured so that the variation in circumferential concentration of germanium at the periphery of the center core is 0.05% or smaller in relative refractive index difference value, the birefringence of the core caused in spinning is reduced, so that the value of the polarization mode dispersion due to the birefringence of the core is reduced to 0.1 ps/(km)$^{(-\frac{1}{2})}$ or lower. This enables high-quality large-capacity optical transmission.

According to the third aspect of the present invention, since the cladding layer is formed after the variation in circumferential concentration of germanium at the periphery of the core rod obtained by dehydrating and sintering the silica-based porous core material is set at 0.05% or smaller in relative refractive index difference value, when the temperature of the dispersion compensating fiber obtained by fiber-drawing the glass material is changed from the melt fiber drawing (spinning) temperature to the normal temperature, the residual stress attributed to the difference in expansion coefficient caused due to the difference in circumferential viscosity of a portion of the core in the vicinity of the cladding substantially equals zero, so that the core, particularly the portion of the core in the vicinity of the cladding is prevented from receiving circumferentially non-uniform tension. This largely reduces the birefringence of the core caused in spinning even when the grinding is performed to shape the profile of the core, so that the polarization mode dispersion due to the birefringence is reduced. As a result, high-quality large-capacity optical transmission is enabled as mentioned above.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which.

DETAILED DESCRIPTION

Hereinafter, an embodiment of the present invention will be described in detail with reference to the drawings.

Figure 2:
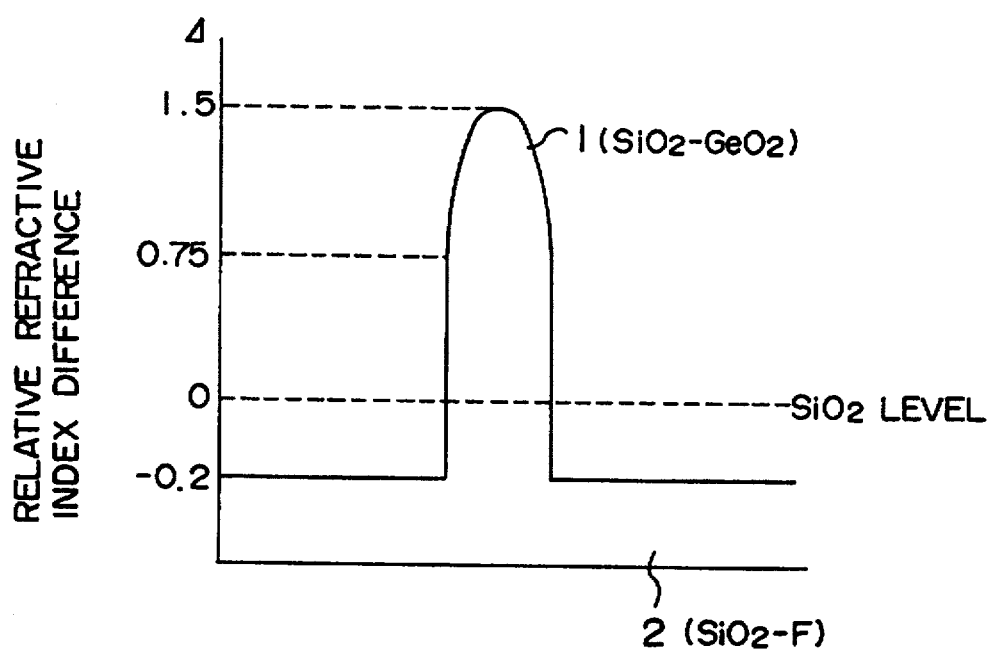
FIG. 2 is a schematic view showing a refractive index profile of a dispersion-compensating fiber according to the present invention.

FIG. 2 shows an example of a refractive index profile of a dispersion-compensating fiber according to the present invention. The refractive index profile shown in FIG. 2 is unimodal. A core (center core) 1 having the highest refractive index is surrounded by a cladding 2 having a low refractive index. When the refractive index of silica is n0, a relative refractive index difference $\Delta$ of a portion having a refractive power n with respect to silica (SiO2) is obtained by $\Delta=\{(n^2-n_0^2)/2n^2\}\times 100$. The vertical axis of FIG. 2 shows a relative refractive index difference with respect to silica.

A coefficient $\alpha$ representative of the refractive index profile configuration of the center core 1 is $\alpha=2$. In the core formed region, germanium is doped so that the relative refractive index difference at the center of the center core 1 is $\Delta_{top}=1.5\%$ and that the relative refractive index difference at the periphery of the center core is $\Delta_{bottom}=0.75\%$ (circumferential average value). In the cladding 2, fluorine is uniformly doped so that a relative refractive index difference $\Delta F$ with respect to silica is $\Delta F=-0.2\%$.

The inventors thought that in the dispersion-compensating fiber, the magnitude of the polarization mode dispersion caused in transmitting optical signals might be related to a variation in circumferential relative refractive index difference at the periphery of the core 1, and produced a multiplicity of dispersion compensating fibers as test samples in the following manner: First, a silica-based porous core material produced by doping germanium by the VAD method was dehydrated and sintered to form a core rod. Then, the surface of the core rod was ground under different conditions to adjust the circumferential concentration of germanium in the vicinity of periphery of the core rod. Then, after the cladding layer was formed by the outside vapor phase deposition method, the core rod was dehydrated and sintered to obtain a glass material. The glass material was fiber-drawn by a known method to thereby obtain dispersion compensating fibers having various magnitudes of variations in circumferential relative refractive index difference at the periphery of the core 1.

Figure 1:
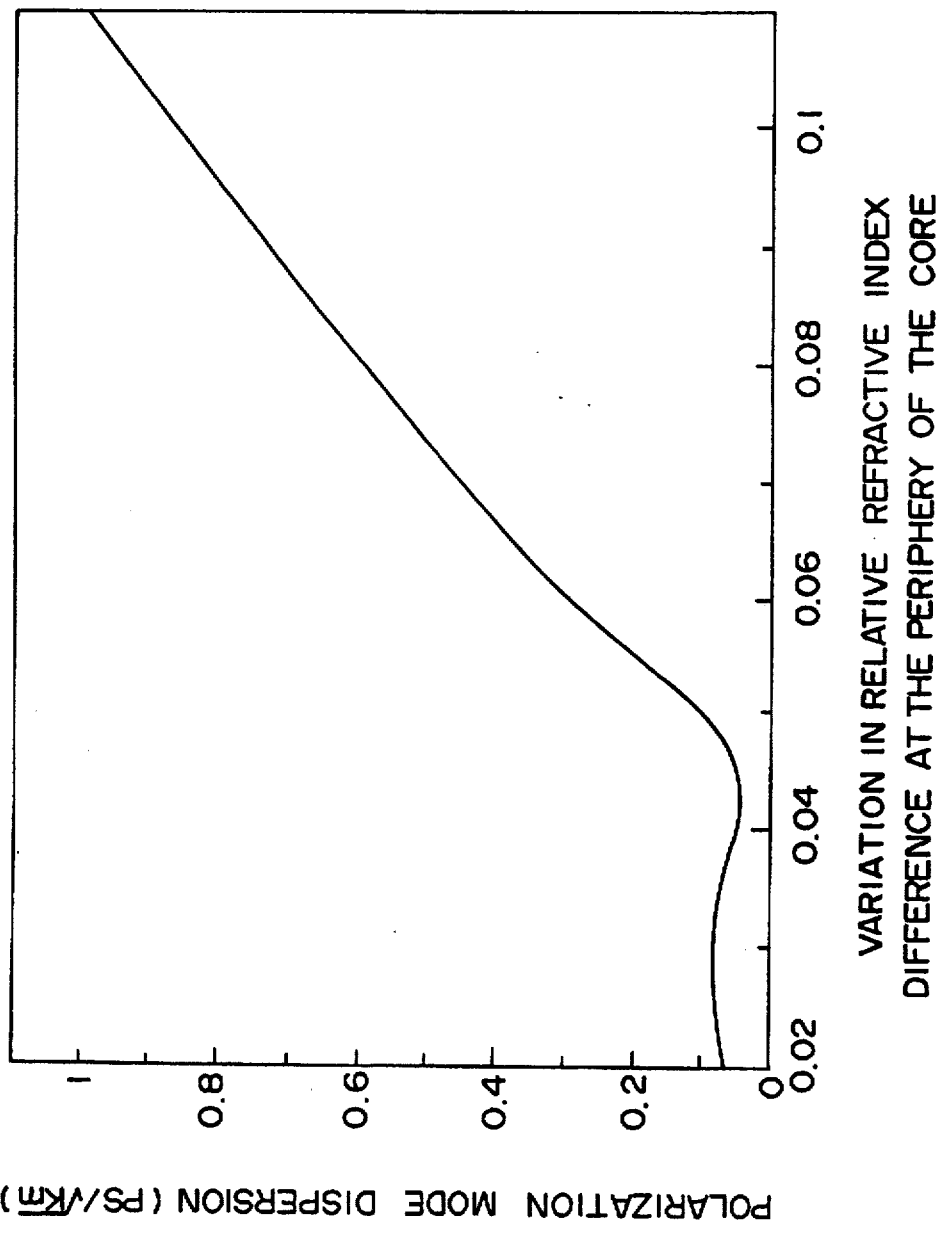
FIG. 1 is a graph showing a relationship between a variation in relative refractive index difference and the magnitude of the polarization mode dispersion at the periphery of the core.

Then, the polarization mode dispersion was measured for each test sample of the dispersion-compensating fiber to obtain a relationship as shown in FIG. 1. In FIG. 1, the horizontal axis represents the difference between the maximum and minimum values of the circumferential relative refractive index difference of the core 1 as a variation in refractive index difference, and the vertical axis represents the polarization mode dispersion. As is apparent from FIG. 1, when the variation in circumferential concentration of germanium at the periphery of the core (the difference between the maximum and minimum values of the circumferential concentration of germanium of the core) of the dispersion compensating fiber exceeds 0.05% in relative refractive index difference value, the polarization mode dispersion abruptly increases and exceeds 0.1 ps/(km)(–½) which the inventors consider as the criterion of quality assurance for ensuring excellent large-capacity optical transmission. Thus, it was found that in order to obtain a dispersion compensating fiber of excellent quality, the variation in circumferential concentration of germanium needs to be 0.05% or smaller in relative refractive index difference value.

The grinding by a chemical technique in producing the test samples of the dispersion compensating fibers was performed while the core rod obtained by dehydrating and sintering the silica-based porous core material doped with germanium is made vertical and an etching solution (HF aqueous solution) is being circulated around the core rod. It was found that in this case, if the grinding is performed with the core rod laid horizontally without the etching solution being circulated, the circumferential grinding of the core rod is nonuniform and the variation in relative refractive index difference at the periphery of the core cannot be set at 0.05% or smaller.

Further, the grinding is necessarily performed so that the viscosity of periphery of the core is smaller than the viscosity of the cladding at the melting temperature for the fiber drawing (spinning). For the viscosity adjustment made by the grinding, for example, data on the profile of germanium concentration from the center to the outer end of the core is input in a computer (the germanium dopant concentration of the core is highest in the center and decreases along the radius), and by using the fact that the viscosities of the core and the cladding at the fiber drawing temperature are the same when the ratio between an amount $q_F$ of fluorine doped in the cladding 2 and an amount $q_G$ of germanium doped in the core 1 is substantially $q_F:q_G=1:3$ (the viscosities of fluorine and germanium both increase as the doping amounts increase), the diameter of the core at which the viscosity at the periphery of the core is smaller than the viscosity of the cladding by an appropriate value is calculated on the basis of data on the amount of fluorine doped in the cladding, and the surface of the core is ground so that the diameter of the core is the one obtained by the calculation. This enables an automatic adjustment of viscosity at the periphery of the core. In order to adjust the viscosity at the fiber drawing temperature, it is also effective to previously dope in the core a trace of fluorine or phosphorus, which functions to increase the viscosity.

In the above-described embodiment, the measurement of the circumferential concentration of germanium at the outermost layer of the core rod, i.e. the measurement of the relative refractive index difference is performed with a preform analyzer (PA) for measuring the refractive index profile (the profile of germanium concentration) along the diameter of the core rod. Specifically, the refractive index profile at each of a zero-degree surface, a 45-degree surface, a 90-degree surface and a 135-degree surface at the cross section of the core rod was measured four times to obtain the relative refractive index difference at each position at the outermost layer of the core rod. Then, the difference between the maximum and minimum values of measurement values of the relative refractive index difference at the four positions was set as the variation in concentration of germanium expressed in the relative refractive index difference. While as the method for measuring the circumferential concentration of germanium, a method using the electron probe X-ray microanalyzer (EPMA) and the refracted near field technique (RNF) are also available, in view of the measurement accuracy, the method using the preform analyzer employed in the embodiment is most desirable.

The polarization mode dispersion which adversely affects the optical transmission is caused due primarily to the asymmetry (non-roundness) of the cross-sectional structure of the core of the dispersion compensating fiber and to the variation in circumferential concentration of germanium at the periphery of the core. The non-roundness of the core is caused in melt-spinning the glass material into a fiber, and probable factors therefor include a shift of the axis caused in fiber drawing and the asymmetry of profile configuration of the relative refractive index difference Δtop at the center of the core (for example, there are cases in which the profile configuration is not axially symmetrical like that of the fiber manufactured by the modified chemical vapor deposition (MCVD) method but notched and in which the profile configuration is shifted from the axial symmetry of an αth-power profile in the vicinity of center of the core to become asymmetrical).

Polarization mode dispersion suppressing methods include a method to correct the non-roundness and a method to suppress the variation in circumferential relative refractive index difference (the variation in circumferential concentration of germanium) at the periphery of the core. As a result of an examination by the inventors of the present invention, it was confirmed that the method to suppress the variation in relative refractive index difference is by far more effective. That is, it was verified that even if the non-roundness remains to some extent, the increase in polarization mode dispersion is sufficiently suppressed by suppressing the difference in relative refractive index difference in the vicinity of the core, i.e. by suppressing the difference in circumferential relative refractive index difference at the periphery of the core.

According to the present invention, since the variation in circumferential concentration of germanium at the periphery of the core is set at 0.05% or smaller in relative refractive index difference value, the variation in viscosity is suppressed which is caused due to the variation in concentration of germanium in melt spinning. Consequently, the tension profile at each position at the periphery of the core in spinning is made uniform, so that the birefringence is suppressed which is due to the residual stress inferred to be caused by the difference in tension in spinning. As a result, the polarization mode dispersion is prevented from increasing in the optical transmission.

Figure 3:
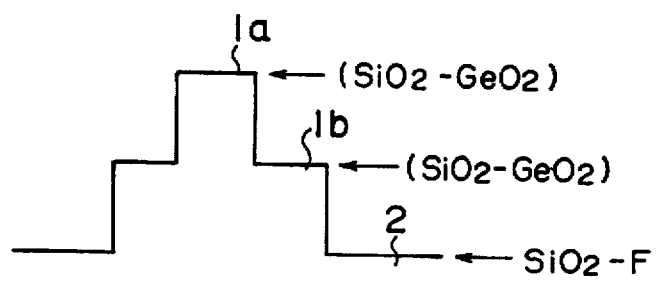
FIG. 3 is a view showing a stepped refractive index profile of the dispersion compensating fiber according to the present invention.
Figure 4:
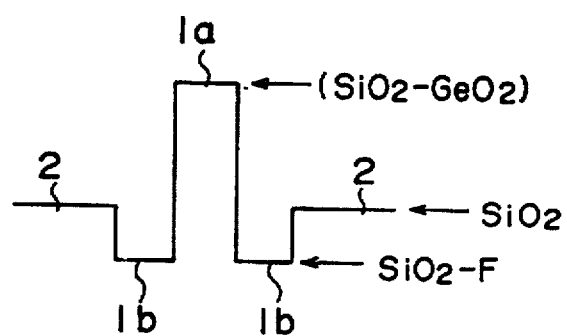
FIG. 4 is a view showing a W-shaped refractive index profile of the dispersion-compensating fiber according to the present invention.

The present invention is not limited to the above-described embodiment but capable of various embodiments. For example, while the refractive index profile of the dispersion compensating fiber is unimodal in the above embodiment, it may be stepped as shown in FIG. 3 or may be W-shaped as shown in FIG. 4. In the example having the stepped profile shown in FIG. 3, the core is formed of a center core 1a and a side core 1b, and the relationship among a refractive index $n_c$ of the center core 1a, a refractive index $n_s$ of the side core 1b and a refractive index $n_L$ of the cladding 2 is set at $n_c>n_s>n_L$.

In the example having the W-shaped profile shown in FIG. 4, the side core 1b having a low refractive index is provided to surround the center core 1a having the highest refractive index, and the cladding 2 having a higher refractive index than the side core 1b is disposed to surround the side core 1b. Furthermore, in optical fibers having the W-shaped profile, a segment layer is provided between the side core and the cladding when necessary. In this case, the bending loss characteristic is improved by forming the segment layer out of silica-based glass doped with germanium.

In the dispersion compensating fibers having the profiles shown in FIG. 3 and FIG. 4, like in the dispersion compensating fiber having the unimodal profile, by setting the variation in circumferential concentration of germanium at the periphery of the center core 1a at 0.05% or smaller in relative refractive index difference value, the increase in polarization mode dispersion is suppressed to thereby enable large-capacity optical transmission.

What we claim is:

1. A dispersion compensating fiber comprising a silica glass core doped with germanium and a silica glass cladding doped with fluorine, said cladding being provided to surround the core, wherein a variation in circumferential concentration of germanium at a periphery of a center core situated in a center of the silica glass core is 0.05% or smaller in refractive index difference value.

2. A dispersion compensating fiber comprising a silica glass center core doped with germanium, a silica glass side core doped with fluorine and a silica glass cladding, said side core being provided to surround the center core, said cladding being provided to surround the side core, wherein a variation in circumferential concentration of germanium at a periphery of the center core situated in a center of a silica glass core is 0.05% or smaller in relative refractive index difference value.

3. A method for manufacturing a dispersion compensating fiber, wherein after a variation in circumferential concentration of germanium at a periphery of a core rod obtained by dehydrating and sintering a silica-based porous core material doped with germanium is set at 0.05% or smaller in relative refractive index difference value, a silica-based porous cladding layer doped with fluorine is deposited to surround the core rod, and then, the core rod is dehydrated and sintered to obtain a glass material which is then melt-spun.

* * * * *

UNITED STATES PATENT AND TRADEMARK OFFICE
CERTIFICATE OF CORRECTION

PATENT NO.    : 5,802,235
DATED         : September 1, 1998
INVENTOR(S)   : Youichi Akasaka, et al.

It is certified that error appears in the above-identified patent and that said Letters Patent is hereby corrected as shown below:

On the title page, insert item [73] Assignee:
The Furukawa Electric Co., Ltd., Tokyo, Japan --

Signed and Sealed this

Twenty-fourth Day of August, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,802,235
DATED : September 1, 1998
INVENTOR(S) : Youichi Akasaka

It is certified that error appears in the above-identified patent and that said Letters Patent is hereby corrected as shown below:

On the tile page, item [75] inventor, should read--Youichi Akasaka--.

Signed and Sealed this

Twenty-seventh Day of February, 2001

NICHOLAS P. GODICI

*Attest:*

*Attesting Officer*  *Acting Director of the United States Patent and Trademark Office*